United States Patent [19]

Elliott

[11] 4,072,055

[45] Feb. 7, 1978

[54] VISUAL-TYPE TEMPERATURE-RESPONSIVE DEVICE

[76] Inventor: Stanley B. Elliott, 7125 Conelly Blvd., Bedford, Ohio 44146

[21] Appl. No.: 759,483

[22] Filed: Jan. 14, 1977

Related U.S. Application Data

[63] Continuation of Ser. No. 559,066, March 17, 1975, abandoned.

[51] Int. Cl.² .......................................... G01K 11/12
[52] U.S. Cl. ................................................. 73/356
[58] Field of Search ......... 73/339 R, 355 R, 355 EM, 73/356, 362 R; 250/225; 350/157, 147, 149, 158; 356/114, 43

[56] References Cited

U.S. PATENT DOCUMENTS

| 3,580,079 | 5/1971 | Crites | 73/358 |
| 3,863,502 | 2/1975 | Elliot | 73/358 |

Primary Examiner—Donald O. Woodiel
Attorney, Agent, or Firm—Baldwin, Egan, Walling & Fetzer

[57] ABSTRACT

A visual-type temperature-responsive device and a method for indicating and measuring temperature including a source for providing a light beam, and means for providing observable changes in temperature of a chemical composition that of itself senses changes in temperature by being abruptly triggered at a desired temperature.

33 Claims, 9 Drawing Figures

VISUAL-TYPE TEMPERATURE-RESPONSIVE DEVICE

This is a continuation of application Ser. No. 559,066 filed Mar. 17, 1975, now abandoned.

This invention is directed to a visual-type temperature-responsive device and a method of indicating and measuring temperature thereby. It particularly relates to a device comprising (1) a source of illumination that provides a light beam, (2) means for providing observable changes in temperature comprising a chemical composition that of itself senses changes in temperature by being abruptly triggered at a desired temperature, and (3) means for detecting observable changes in the brightness of the light coming from the composition when the light beam contacts the composition.

The chemical composition that of itself senses the changes in temperature is birefringent at a first temperature and nonbirefringent at a second temperature. This change can be detected by passing the light beam through a polarizer and passing the polarized beam through the composition to an analyzer. Or the first polarizer may be a circular polarizer, in which case the polarized beam is passed through the composition to a suitable mirror and is then reflected back along its original path. The composition is also translucent at a first temperature and clear at a second temperature and the abrupt observable change in light coming from a light beam which contacts the composition (due to a change in temperature) is readily observed by the unaided eye or a device such as a photocell.

The light detecting means can be electrical means responsive to observable changes in the brightness and intensity of the light coming from the chemical composition, the light coming from the composition at the first temperature being of sufficient brightness and intensity to provide a visual signal to activate the light-detecting means.

In one embodiment, crystals which are birefringent in the solid form are displayed between a polarizer and analyzer so that changes in birefringence may be readily observed. When the melting point of the compound is reached its crystal structure is destroyed and so is its birefringence. By selection of suitable birefringent crystalline compounds, having varying melting points, a series of highly visual displays may be readily assembled to comprise an efficient thermometer. Such a system will be referred to as a solid/liquid system.

In another embodiment, crystals which are birefringent in the solid form below or above what I choose to call the "crystal conversion temperature" are displayed between a polarizer and an analyzer (preferably crossed) so that changes in birefringence may be readily observed. When the crystal conversion temperature of the compound is reached the birefringent crystal structure converts to a nonbirefringent crystal structure. By selection of birefringent, crystalline compounds having varying crystal conversion temperatures, a series of readily observable displays may be readily assembled to comprise an efficient thermometer. Such a system will be referred to as a solid/solid system.

I especially claim the use of polarized light for the amplification of the signal generated by compounds whose change in optical properties are directly a result of their temperatures. For not only is there a brilliant white to blue-black, go-no go visual output, but it is instantaneous. That is, at the moment of "crystal conversion" (the point at which the solid undergoes the birefringent/nonbirefringent change) in the solid/solid system for melting in the solid/liquid system there is a go-no go amplified signal available. This is in contrast to such attempts as having dyes dissolve in or materials react with a melted compound to give an amplified signal indicating that a change has indeed taken place. For many purposes a sequential read-out of a number of temperature sensing plaques is desirable, and the "thermometer" is exposed to the heating source for but a brief time, before a reading is taken. If dyes must dissolve or compounds react to form colored reaction products in order to be sure that a certain temperature has indeed been reached, serious errors may result. Amplification using polarizers eliminates all these errors and uncertainty, for it is as fast as the melting or "crystal conversion" itself.

Ordinarily the change in appearance from brilliant white to blue-black using polarizers signifies a change from a birefringent crystal structure to an isotropic state. Theoretically at least, there is another state which might be termed a "pseudoisotropic" state. In such an instance a thin film of the signalling compound would appear blue-black between crossed polarizers. That is, it would appear isotropic to any ordinary visual inspection. But this pseudoisotropy would be due to a uniform alignment of the optical axes of the molecules comprising the film in relation to the plane of the film. Thus, if it were possible to somehow examine the optical properties of the film in the plane of the film, it would be found that such properties are different from those perpendicular to the film. This special case is mentioned for, though truly isotropic films generally form, I mean to include also those instances where pseudoisotropic films form for their signalling properties are equivalent.

The solid/solid system is especially useful because the presence or absence of birefringence is an inherent thermal property of the selected molecules and so is quite stable against drift. Solid/liquid systems, however, which depend on the melting point of particular systems, must be formulated with care and protected from any deleterious effects which would introduce impurities. For the melting points of materials are susceptible to substantial variations when impurities are present.

Ordinarily it is desirable to seal or encapsulate the indicating chemical compositions within hermetically sealed transparent, thermally conducting shells to protect the materials from possibly deleterious gases such as oxygen, water vapor, etc. by precluding them. However, there are some compositions which are substantially inert to such gases and these need not be protected unless desired.

There are many accurate thermometers available whose operation depends on the expansion and contraction of various fluids, solids, or gases. There are others which depend on various electrical effects. Many are distinguished by a lack of ruggedness and an inability to readily be formed into displays of varying size - whether very large for industrial situations or very small as for use on an integrated circuit where the temperature of a solid state component must be monitored. Others may indicate temperature by the formation of color bodies in an indicating "melt" at a particular temperature, but this irreversible feature is not always desirable. Still others may indicate temperature irreversibly through the fusion of opaque waxes or similar materials at a particular temperature or more usually over a temperature range to a melt which stays clear even on cooling. Liquid crystals also may be used to indicate temperatures, but they are so expensive as to limit thermometers based on them to certain specialized uses. Further, liquid crystal compositions are susceptible to drift from the effect of trace impurities such as moisture.

In contrast to the industrial devices described above, the thermometers and other temperature-responsive devices of the present invention are rugged, inexpensive, easily read, and stable. Further, since the melting or crystal conversion temperatures of appropriately chosen compounds are very sharp, go/no go indication is readily secured. By contrast, the reaction of compounds to form color bodies, for example, does not occur solely at a particular temperature. The use of linear or circular polarizing materials as amplifiers of the optical transitions from birefringent to nonbirefringent is especially useful in emphasizing the go/no go aspect of the optical signal.

Accordingly, one of the objects of the present invention is to provide a visual-type thermometer in which a number of delineated areas change sequentially from clear to opalescent or from blue-black to brilliantly white (if polarizers are used) as the temperature changes.

Still another object of the invention is to provide a visual temperature alarm in which a relatively large area changes from clear to opalescent or from blue-black to brilliantly white (if polarizers are used) as the temperature varies from some desired point. In such a device suitable warning legends may appear to the viewer after the temperature has deviated from the desired range.

As a variant of this, a temperature-sensitive compound which is birefringent below a selected temperature but which is nonbirefringent above the temperature is deposited on a suitable substrate. This may be sealed into a double-pane window of the type used for insulating purposes and in which the space is moisture-free, and the whole placed between crossed polarizers to form a temperature-sensitive system. If direct sunlight falls onto the system the temperature rises and the system no longer transmits an undesirably high amount of light. If desired, of course, the crossed polarizers may be within the sealed double-pane window or comprise the pane surfaces. Or single pane windows may be coated, with appropriate encapsulation of the chemical composition if its structure requires preclusion of gases such as oxygen and water vapor, the polarizing members being appropriately placed in relation to the temperature-sensing coating.

Still another variant would utilize an edge-sealed "sandwich" of crossed polarizing sheets, the interior of one or both sheets being coated with one or more coatings which have different temperature response points. The net effect of having multiple, thin coatings having differing birefringent/nonbirefringent temperatures is that the amount of light transmitted changes gradually as the temperature shifts. Suitable dyes which absorb heavily in the infra red but only slightly in the visible range may be coated onto the substrate before the temperature-responsive materials are coated onto it or the dyes may be incorporated directly into the responsive compositions. Such a sandwich structure comprises a kind of automatic "Venetian blind" when the hot sun strikes it directly if it is installed close to a window within a structure.

Another object of great importance is to create devices for controlling the immense output of light which accompanies nuclear explosions. For both military and civilian applications a mode is needed for instantaneously blocking the great burst of radiation characteristic of such phenomena. Photochromic dyes have been used for controlling such radiation but they offer many problems for they degrade with time. Many of the materials of the present invention comprise materials of great stability. Used with crossed polarizers, the solid/solid transition materials are of exceptional interest for with them there is not the time lag born of absorbing sufficient heat to melt the composition. If carbon tetrabromide is used, for example, at the moment the composition reaches approximately 117° F. crystal conversion occurs and the polarizing pair blocks light. Infra red absorbing dyes which absorb visible light only slightly can be used with such systems to provide "light gates" for goggles, aircraft windows, and a variety of windows which should block radiation in the event of a nuclear explosion.

Additional objects and advantages of the visual-type temperature-responsive devices of the present invention will be apparent to one skilled in the art to which it pertains and upon reference to the following disclosure of several preferred embodiments thereof, and which are illustrated in the accompanying drawings in which.

Figure 1:
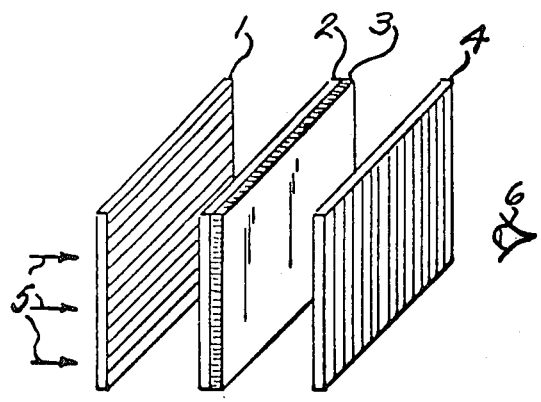
FIG. 1 is a view of a typical transmission-type system.

In a representative embodiment of the visual-type temperature-responsive device of the present invention shown in FIG. 1, a light beam from light 5 which may be a window, a tungsten lamp, a fluorescent lamp, etc. passes through polarizer 1 where the light beam is polarized. The beam then passes through transparent or translucent substrate 2 which may be glass or some isotropic plastic such as cellulose triacetate, on which is deposited crystal layer 3. The beam passing through 2 and 3 then encounters analyzer 4 whose polarizing axis is usually at right angles to the polarizing axis of 1 so as to result in what is generally termed a "dark field."

If the coating 3 or substrate 2 is in its nonbirefringent mode, little light passes through the analyzer 4 and the system appears "dark field" to viewer 6. However, if the temperature changes sufficiently, coating 3 becomes birefringent. When a light beam enters a birefringent or, as it is sometimes called, double refracting material, it is divided into two components, one defined as an extraordinary ray and the other as an ordinary ray, each vibrating in a direction at right angles to the other and traversing the birefringent material with a different velocity to thereby introduce a phase difference therebetween. As said beam is thereby resolved into two components, one of which is retarded with respect to the other, said beam is generally referred to as being elliptically polarized. The two components emerging from the birefringent material and entering the second sheet of polarizing material 4 are resolved into one plane-polarized beam again. But a phase difference has been introduced between the two parts of the same beam, and so the necessary conditions for interference are present. With a white light source brilliantly colored light beams will emerge from analyzer 4 if the coating 3 crystallizes in large crystals. If the crystals are very small there is a mixing of colors and the crystal mass appears white. But in either case the field which was previously a blue-black passing very little light now glows brilliantly. The system may be hermetically sealed in the absence of any undesirable gases such as oxygen or moisture.

Figure 2:
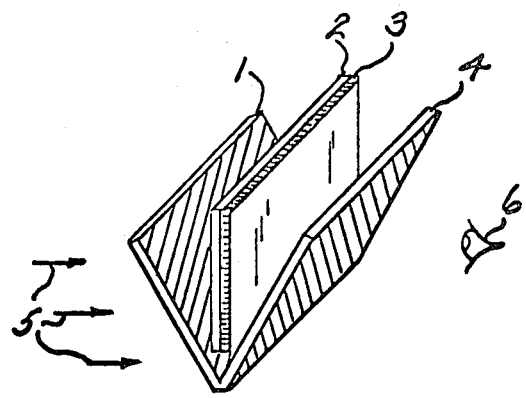
FIG. 2 is a view of a transmission-type system using a single piece of polarizing material.

FIG. 2 is essentially the same as FIG. 1 but better adapted to mass production in that a single piece of polarizing material is folded at 45° to its polarizing axis. This forms two leaves 1 and 4 whose polarizing axes are at right angles to one another and so creates a "dark field" condition when the viewer 6 interposes the folded layers between him and light source 5. A substrate coated with temperature-sensitive layer 3 is then inserted to create a temperature-responsive sandwich. Or, if desired, the layer 3 may be coated on one or both inner surfaces of 1 and 4 so as to eliminate the need for a separate substrate. If the particular temperature-responsive component is affected by moisture or other gases the system may be hermetically sealed in the absence of any undesirable gases.

Figure 3:
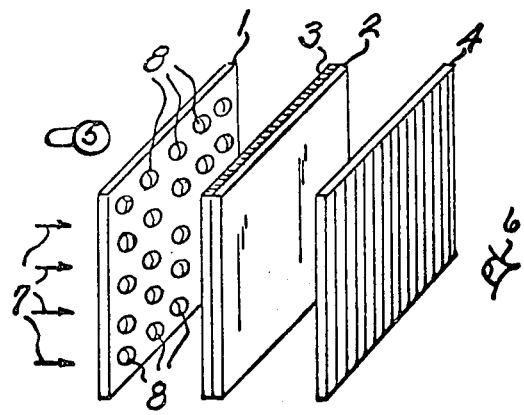
FIG. 3 is a view of a transmission-type system designed to most efficiently check the temperature of a gas stream normal to the polarizer and analyzer.

FIG. 3 typifies a transmission-type system useful for checking the temperature (and uniformity of heat and/or air distribution) of air emerging from ducts. Air stream 7 passes through apertures 8 pierced in polarizer 1 illuminated by lamp 5. The air stream then encounters temperature-sensitive layer 3 coated onto substrate 2. If the temperature-sensitive coating is affected deleteriously by such gases as oxygen or moisture it may be encapsulated or otherwise sealed behind a coating or shell non-permeable to the gas which it is desirable to exclude. Viewer 6 scans the system through analyzer 4 to determine the uniformity of birefringence.

Figure 4:
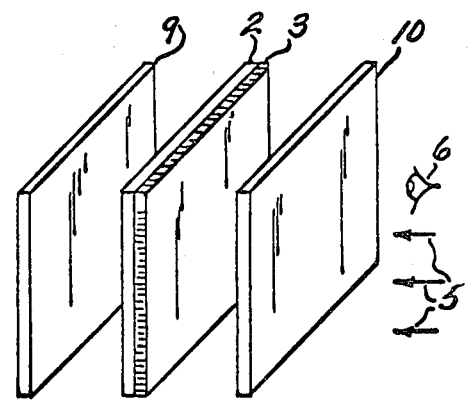
FIG. 4 is a view of a typical reflection-type system.

FIG. 4 typifies a reflection-type system in which light beams from a source 5 pass thrugh polarizer 10 where they are polarized. They then pass through the temperature-sensitive layer 3 coated on substrate 2 to the polarization-conserving mirror 9. The mirror reflects the beam back through the polarizer 10 which now serves as an analyzer. As a variant of this system a circular polarizer may be used for 10 in place of the usual linear polarizer. Then, when the coating 3 is non-birefringent, no light will be reflected back through 10 because the circular polarizer has polarized the beam to a "right-handed" or "left-handed" helix form which cannot pass back through the circular polarizer 10. When coating 3 becomes birefringent, the polarization form of the light which is reflected from the mirror is altered and the returning light passes through the polarizer 10.

Figure 5:
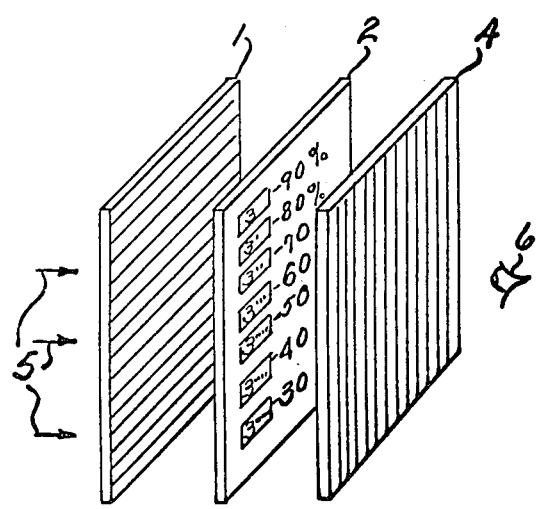
FIG. 5 is a view of a typical transmission-type system using sequential temperature series plaques.

The substrate on which the temperature-sensitive layer is deposited may be a smooth material such as isotropic glass if the device is to be operated in the horizontal plane. However, when the device is vertical and the system is a solid/liquid type, the composition in the liquid condition may drain to the bottom of the plate under the influence of gravity. Under such circumstances, since roughening of the surface generally allows the solutions used to wet the substrate more thoroughly, plaques may be sandblasted or etched into substrate, to give anchorage to the solutions and prevent their moving downward across the poorly wetting smooth surface. Such a unit is shown in FIG. 5 where the coatings 3, 3',3", etc. are applied to etched areas on the substrate.

To further control drainage problems the solutions of temperature-sensitive compounds may be deposited before drying in quite small areas, of circular shape, for example, either on smooth or etched spots on the substrate. These "droplets" may be "printed" on the surface, for example, or they may be deposited by spraying through apertures in a mask over the substrate. The droplets of solution, analogous to the dots which comprise "half-tone" pictures, may be arranged to form plaques, temperature legends, warnings, etc.

Temperature-sensitive salt solutions may also be deposited in narrow channels or holes engraved into such substrates as transparent acrylic polymers. Such channels serve to hold the salt in its liquid form yet make effective displays when the compound has solidified and birefringence has appeared. The channels may form numbers indicating the particular temperature range of the salt filling the channels or may form rectangular display panels, etc.

Either compounds which indicate by way of solid/solid conversion or solid/liquid melting may be conveniently applied as aqueous or nonaqueous solutions. In such cases the compounds are conveniently compounded with wetting agents to lower their surface tension so that they may wet the chosen substrate. Since salts or other polar compounds are often selected for use as temperature-sensitive materials, the wetting agents are most suitably of a nonionic form. Further, to obtain effective but controlled wetting of the substrate, sufficient wetting agent is desirably compounded into the solution to obtain a surface tension near but not below the Critical Surface Tension of the substrate. That way a small contact angle is secured but wetting does not proceed spontaneously across the entire surface so as to exacerbate drainage problems due to gravity.

Though generally good wetting is desired, in special cases poor wetting may be advantageous to create warning devices. Thus, a solution of a temperature-sensitive compound of the solid/liquid system having a naturally high surface tension may be sprayed onto a substrate in such a concentrated form that it dries almost immediately at the temperature and/or relative humidity present under spraying conditions. This temperature-sensitive film on its carrier substrate may then be displayed in typical transmission- or reflection-type temperature-responsive devices where an evenly Illuminated, birefringent surface is maintained so long as the temperature remains below the melting point of the particular compound. Above the melting point, the crystals liquefy. The high surface tension of the liquid then causes it to pull together into droplets. Thus, even if the dangerously high temperature is subsequently lowered, a simple visual inspection of the film will reveal by the presence of the droplets that the danger point was indeed passed.

Figure 6:
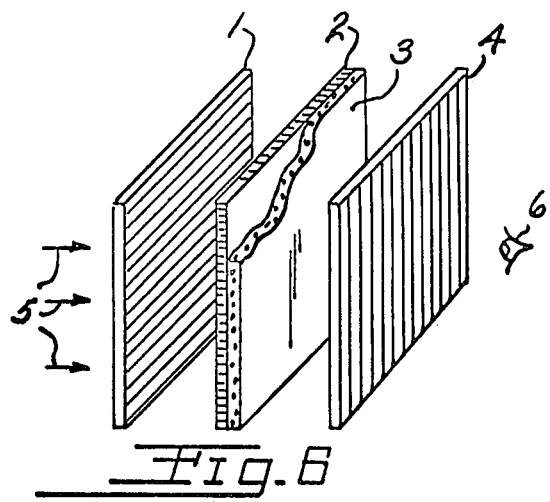
FIG. 6 illustrates another embodiment of a typical transmission type such as shown in FIG. 1.

As another method of applying this invention, as shown in FIG. 6, it is possible to disperse droplets of materials in solution, or droplets of melted materials, or finely divided solid materials, all of which are temperature-sensitive in appropriate vehicles of a type which might be called "lacquers." As would be expected, aqueous droplets would be dispersed in nonaqueous "lacquer," and finely divided particles of non-polar organic materials would be dispersed in an aqueous "lacquer" vehicle. Such coatings 3 may then be applied to suitable substrates 2, where on evaporation of the solvents, the droplets or particles remain encapsulated in the solidified vehicle. If vehicles are selected having appropriately high melting or softening points, such coated substrates may be observed directly for optical changes as the temperature of the system changes. Or the substrate may be placed between polarizing elements 1 and 4 to form temperature-responsive devices of the type already described.

Figure 7:
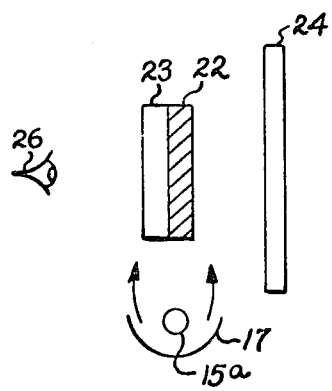
FIG. 7 is a view of a visual-type temperature-responsive device in which the chemical composition itself senses changes in temperature by being translucent at a first temperature and clear at a second temperature. The composition is illuminated from the side and changes in temperature are easily observed against a dark field background.

Turning to FIG. 7 in the drawings, it is a view of a visual-type temperature-responsive device having a source of illumination 15 providing a light beam 15a and a reflector 17 for directing a beam toward a transparent, substantially isotropic substrate 22 (similar to substrate 2 of FIG. 1) such as glass on which is deposited chemical composition layer 23 (similar to layer 3 of FIG. 1) that of itself senses changes in temperature.

A dark-field backing 24 is provided so that the eye 26 of a viewer sees a dark-field when the chemical composition of layer 23 is isotropic and clear at a second temperature. The dark-field lights up when a change of temperature abruptly triggers the composition at a predetermined temperature from an isotropic and clear state characteristic of the second temperature to an anisotropic and translucent transmission state characteristic of a first temperature. By using a dark-field backing and side lighting, the light detecting means for detecting observable changes in the brightness and intensity of the light coming from the composition can be the eye of an observer or an electrical means responsive to the visual signal at the first temperature such as photoresponsive solid state electronic device including a photocell.

Figure 8:
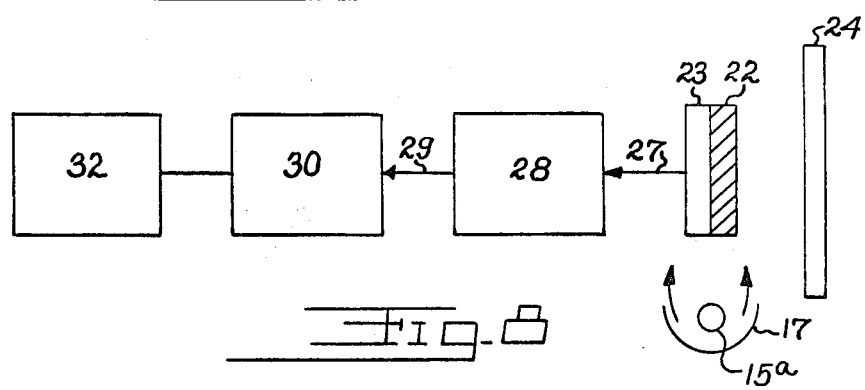
FIG. 8 shows an electrical-type thermometer in which light-detecting means is responsive to observable changes in brightness coming from the composition that of itself senses changes in temperature.

An electrical-type temperature-responsive device is shown in FIG. 8 in which the visual signal indicated by 27 from the chemical composition of layer 23 is picked up by a photo-responsive electrical sensing device 28 such as a photocell, a light-activated silicon controlled switch, a planar silicon phototransistor, a planar silicon photodarlington amplifier, or a photo diode. A signal 29 is provided from a device 28 to electrically control means 30 such as a relay which controls electrical power to activate an electric circuit 32.

Figure 9:
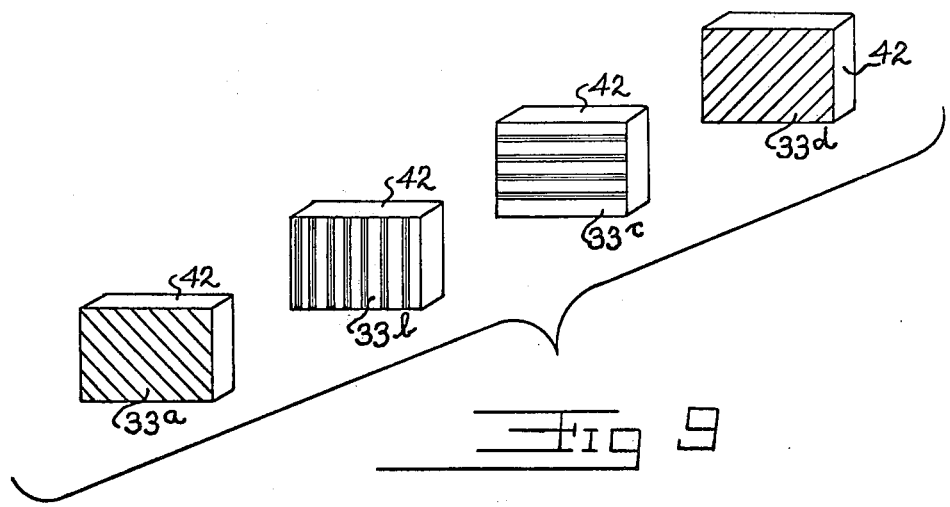
FIG. 9 shows a visual-type thermometer in which at least two discrete areas are occupied with a series of compositions whose birefringence terminates at different temperatures.

FIG. 9 shows a visual-type temperature-responsive device comprising a series of panels comprising a transparent base 42 with a series of compounds 33a, 33b, 33c, and 33d which are optically spaced from each other in parallel planes. The bases have a series of chemical compounds 33a, 33b, 33c, and 33d that occupy at least two discrete areas in each panel, the compounds having birefringence that terminates at different temperatures. The compounds, as in the case of FIG. 5, are applied to etched areas of the base or substrate 42.

Compounds that of themselves sense changes in temperature may be grouped into two systems as was noted earlier. Compounds of the solid/solid system have the remarkable property of converting from the birefringent state to the nonbirefringent state at a particular temperature typical of the compound, which I have named the "crystal conversion temperature." I do not intend to be bound by theory, but it appears that heating the material weakens the intermolecular bonds which have maintained its "low temperature" crystal structure. Thus, rotation of the molecules or portions of the molecules may occur so that conversion to a different crystal form can occur. I particularly claim the use for signalling purposes of those conversions of crystal structure which are characterized by abrupt changes from the anisotropic state to the isotropic as the temperature passes through the crystal conversion temperature. Though the opalescent/clear optical change of the solid can be monitored by the eye or suitable instruments, exceptionally vivid optical changes are noted when the birefringent/nonbirefringent change is monitored with crossed-field linear polarizers or a circular polarizer with a mirror.

Such unusual molecular configurations are not easily established precisely. However, I theorize the molecular structures which exhibit the remarkable phenomenon are those of relatively high potential symmetry so that they tend to assume symmetrical structures as the rise of temperature reduces the bonding forces within the unit cell characteristic of the compound at temperatures below the crystal conversion point.

I have found that carbon tetrabromide, for example, can be melted on a suitable isotropic material such as a glass plate and cooled to give a thin, solid layer. If such a layer is viewed through crossed polarizers and the ambient temperature is raised, at a precisely reproducible temperature the brilliantly glowing field suddenly becomes blue-black as anisotropy disappears. On reducing the temperature below the crystal conversion point, which is about 117° F., the birefringence appears just as suddenly. By comparison, the melting point of carbon tetrabromide is 198° F. Carbon tetrachloride has a very low crystal conversion point so it may be mixed with carbon tetrabromide in various ratios so as to create a temperature-responsive series covering the range below 117° F. Carbon tetraiodide, having a high crystal conversion point, bromide in suitable ratios to create a high temperature series.

Ammonium nitrate, $NH_4NO_3$, as another example, has been found to have a crystal conversion point of about 260° F. By judicious choices of other individual compounds, or by comixing responsive compunds of similar polarity in various ratios, various temperature-responsive series may be prepared. As noted before, relatively symmetrical molecules are generally the types which are responsive, tetramethyl methane, tertiary butyl halides, the methyl and chloro penta- and hexa- substituted benzenes, pentaerythritol, and pentaerythritol tetraacetate being examples.

To prevent oxidation or the deleterious effect of moisture, or to prevent evaporation if the selected compounds have appreciable vapor pressures, it may prove desirable to hermetically seal the responsive materials within a nonpermeable outer shell. Depending on the structure desired, the temperature-responsive salts may be coated on one or both of the polarizers or on a separate substrate. Or a polarization-conserving mirror can be coated and a circular polarizer used for viewing, if visual amplification is desirable. If the compound is coated directly onto a mirror and viewed directly or through an isotropic cover plate, of glass for example, the birefringence/nonbirefringence conversion may then be observed directly.

From an esthetic and pragmatic standpoint it is desirable to coat the isotropic substrate with a very thin, evenly distributed layer of the selected compound or compounds. This is especially important if multi-coats are to be laid down so that the system might serve as a sun-screen for example, one layer after the other sequentially triggering as the temperature of the system rises. For such coating I have found it highly useful to compound the selected compounds with organic or inorganic polymers with which the materials are compatible after the carrier vehicle has evaporated. For salt-type compounds I prefer polymers containing repetitive oxygen-bearing groups including the hydroxyl, the carboxyl, the sulfonic acid group, or mixtures thereof repetitively present along a substantially linear chain. Examples of these polymers which are preferably solid are as follows: methoxy group - methoxycellulose; polyether group - polyethylene oxide; hydroxyl group - polyvinyl alcohol, hydroxyethyl cellulose; carboxyl group - poly (methyl vinyl ether/maleic anhydride), poly (styrene/maleic anhydride), poly (ethylene/maleic anhydride), polacrylic acid; sulfonic acid group - polyvinylsulfonic acid; pyrrolidone group - polyvinylpyrrolidone. Usually it is necessary to neutralize the carboxyl or sulfonic groups with an appropriate basic compound so that the system as a whole is neutral or slightly basic. Further, other copolymers may be polymerized in the formation of these materials without materially altering their effectiveness so long as the polar groups dominate the polymers' structures. For example, polyacrylic acid may be modified by the inclusion of methacrylic acid during polymerization. Or other polymers can be copolymerized with the acrylic acid to produce highly acidic so-called "acrylic emulsions" which function much as the pure polyacrylic acids do.

I have found that the molecular weight of the polymer is not a critical matter, so long as the temperature-sensitive salt is adequately soluble in the polymer/solvent mixture. Because of the rheological requirements of the coating process and the need for appropriate physical qualities in the final solid film, the concentration of salt, polymer, and solvent are appropriately adjusted, depending on the nature of the components.

As would be expected, a less polar type of polymer usually proves best for compounding temperature-responsive materials having non-salt structures. Suitable examples include the following: polystyrene, polymethyl acrylate, ethylcellulose, and cellulose acetate. In such instances the solvents selected for the systems are also usually of limited polarity. N-methyl-2-pyrrolidone, the lower alcohols, and the aromatic solvents illustrate types which are usually suitable alone or in admixture.

In some circumstances it may prove desirable to substitute very finely divided particles for polymers in order to bring about suitable adjustment of the rheology of the coating solutions containing the temperature-responsive compounds. Or the finely divided particles may be used in conjunction with dissolved or highly swollen polymers. The particles as a general class are distinguished by their high surface area and may include such materials as diatomaceous earths, pyrogenic silica or aluminum oxide, precipitated silica, silica sols, and similar materials.

A variety of modifying agents may be used to develop suitable specialized coatings, including finely divided inorganic particles for controlling opacity, plasticizers for modifying the mechanical properties of the polymeric binder, infra-red absorbing dyes to control the rate of heating of the film, surface-active compounds to facilitate smooth coating, etc.

If desired, instead of directly coating the substrate with compounded solutions of the type described, the temperature-responsive materials (either alone or mixed with suitable modifying agents) may be encapsulated within polymeric outer shells. Such encapsulation into very small spheres is now a common practice with a variety of materials. After encapsulation the tiny spheres are then coated onto suitable substrates and dried to produce a system which performs much like that produced with compounded solutions.

I have just described typical solid/solid systems. As I noted earlier, there are also solid/liquid systems which function as highly useful visual signalling systems. The solid/liquid system depends on an entirely different phenomenon from that discovered and used as the basis for the solid/solid signalling system. In particular, it is based on the discovery that certain compounds are not only birefringent in the solid form but they retain this birefringent quality up to their melting points, at which time the birefringence disappears concurrently with the change in state from solid to liquid.

Various techniques have been used for determining the the melting point of organic and inorganic compounds. Some techniques involved change in heat content, some change in volume, and others even the change in appearance when the finely divided power being tested collapsed into a denser, usually darker melt at the melting point. But as my signalling materials I choose to use materials which are anisotropic in the solid state up the melting point and which then change to isotropic liquids at the melting point. It is the opalescence of the anisotropic state shifting to the clarity of the isotropic state which I use for my signalling when the appropriate temperature has been reached. As noted before, linear polarizers or a circular polarizer and mirror may be used if desired to amplify this change from anisotropic to isotropic (and back to anisotropic on cooling).

Just as with the solid/solid system, the system may be hermetically sealed to prevent any deleterious effects from oxygen, moisture, or to prevent evaporation of the indicators if desirable. Or if the temperature-responsive compounds are quite stable and of very low vapor pressure they may be coated onto a substrate and left unsealed. Because of the solid/liquid transition I have found that depositing a material in the form of droplets eliminates drainage problems in the vertical mode as I have described before. Or minute particles of the temperature-sensitive compound may be encapsulated in tiny inert polymeric shells and the spheres deposited on a suitable substrate.

Though I prefer pure materials for most temperature-responding purposes, the presence of other materials can be useful. Very pure materials generally melt very sharply. The introduction of controlled quantities of other materials can produce a spread in melting which is quite useful for some thermal alarm devices.

Polymeric materials of varying polarity together with appropriate solvents can be used for compounding both salt-type and non-salt-type materials for solid/liquid systems just as with the solid/solid systems. However, great care must be used to avoid choosing polymeric materials whigh might contribute a drift in melting point of the temperature-responsive compounds due to the effect of impurities dissolving out of the polymeric matrix into the indicator compounds. Just as before, infra-red absorbing dyes, opacifiers, and other compounding agents can be used so long as their effect on the melting points of the indicating compounds is carefully monitored.

Magnesium nitrate, hexahydrate, $MgNO_3.6H_2O$, is an excellent example of a salt-type compound which is strongly birefringent below its melting point of about 203° F, but which passes into the nonbirefringent mode above this temperature. Benzophenone is a fine example of a non-salt compound which passes from a strongly birefringent solid below about 118° F. to the nonbirefringent mode when melted. By selecting suitable materials from the many pure organic and inorganic compounds available, a variety of excellent visual-type temperature-responsive devices can be assembled.

Indole is another example of a material exhibiting strong birefringence below its melting point, 125° F. and changing to a nonbirefrigent liquid above it. The following is a good example of an homologous series of fatty acid compounds exhibiting good birefringent/non-birefrigent transitions at their melting points: caproic (24° F.), caprylic (61° F.), capric (88° F.), lauric (111° F.), Myristic (130° F.), Palmitic (145° F.), and stearic (157° F.). Mixtures of acids can be used to secure intermediate melting points. Many other similar series may be used, of course.

I have now mentioned two inorganic compounds which are very effective in my systems: ammonium nitrate for use in solid/solid systems and magnesium nitrate hexahydrate for use in solid/liquid systems. Although the first compound crystallizes in the anhydrous form, the second customarily is hydrated. However, both compounds are so very soluble in water that they tend to deliquesce if exposed to air of a high enough relative humidity. However, unlike one of the systems described in my U.S. Pat. No. 3,776,038, deliquescence is not an essential part of this invention. Indeed, in many circumstances such adventitious moisture as might accidentally be sorbed during manufacture of devices using these materials could be deleterious to their most efficient and precise function. Thus, I have specified that the systems utilizing materials such as these salts be sealed to preclude moisture pick-up (or loss, as well, in the case of hydrated compounds such as magnesium nitrate hexahydrate). Compounds such as the fatty acids do not tend to pick up moisture from the air and so they may be left unsealed if desired.

Summarizing, U.S. Pat. No. 3,776,038 claims the use of both solid/solid and solid/liquid indicating compounds in which the acquisition or loss of moisture is an absolutely essential part of their signalling function. In the present invention water may be present in the signalling composition through accidental pick-up of moisture or because of water crystallization in the compound selected. But the pick-up or loss of water has nothing to do with the signalling function in the present invention. Thus, with the present invention, if magnesium nitrate hexahydrate is placed in an isotropic sealed tube with no gas above it and heated it melts at about 203° F. When viewed between crossed polarizers, at the melting point the composition which has appeared brilliantly white until then abruptly appears blue-black. If the same magnesium nitrate hexahydrate is used to practice the hygrometric/thermometric aspects of U.S. Pat. No. 3,766,038 the salt is spread thinly on a substrate and placed in a sealed system containing a gas of controlled humidity. As the system is cooled the relative humidity rises until it reaches the deliquescent point of the salt at which point the salt disolves in the water removed from the gas. If viewed through crossed polarizers the composition which has appeared brilliantly white until then appears abruptly as blue-black on dissolving. In the present invention the triggering temperature is an essential function of the signalling compound selected. In U.S. Pat. No. 3,766,038 in the standard mode the triggering temperature is a function of both the compound and the humidity of the material encapsulated above the signalling compound or within its microstructure.

Many crystalline compounds can exist in various crystal forms, changing from one form having a particular melting point to another form which may have a melting point substantially different. The change can be brought on by temperature changes or it often can be induced or accelerated through the inclusion of crystallization nuclei. Thus, through a judicious choice of indicating compounds irreversible indicators or indicating series can be formulated in which due to temperature changes crystals have formed which no longer revert to their earlier structure when the temperature changes again. Such indicators are especially useful in indicating when the equipment being monitored has deviated from the desired temperature range for any significantly long period.

What is claimed is:

1. An optical-type thermometer comprising (1) a source of illumination providing a light-beam, (2) means for providing observable changes in temperature comprising a layer on a substantially isotropic transparent substrate of a solid chemical composition of constant melting point that of itself senses changes in temperature, the composition being abruptly triggered at a predetermined temperature from an anisotropic solid transmission state characteristic of the first temperature immediately contiguous to the predetermined temperature to an isotropic liquid state characteristic of the second temperature, (3) means to intensify observable changes in the brightness and intensity of the light coming from the composition when the light-beam contacts the composition comprising a polarizer for polarizing the light-beam and an analyzer for analyzing the beam, the light-beam traveling through the composition that doubly refracts the beam when birefringent at the first temperature to pass the beam on through the analyzer, (4) light detecting means for detecting observable changes in the brightness and intensity of the light coming from the composition when the light-beam contacts the composition, the light from the composition at the first temperature being of sufficient brightness and intensity to provide an optical signal at the first temperature but not at the second temperature.

2. A device as defined in claim 1 in which the light detecting means includes electrical means responsive to the visual signal at the first temperature and non-responsive to the signal at the second temperature.

3. A device as defined in claim 2 in which the electrical means includes a photo-responsive solid state electronic device.

4. A device as defined in claim 2 in which there is electrical control means responsive to the electrical means that is responsive to the visual signal, the control means for controlling electrical power to activate an electrical circuit.

5. A thermometer as defined in claim 1 in which the temperature-responsive device is a transmission-type in which the light beam passes through the polarizer and the polarized light beam passes through the composition, where it is doubly refracted at the first temperature, and the emerging refracted beam passes through the analyzer.

6. A thermometer as defined in claim 1 in which the temperature-responsive device is a reflection-type, the light beam passing through the polarizer and the chemical composition to a mirror and then being reflected back through the composition and the analyzer.

7. A thermometer as defined in claim 1 in which the composition is located between the polarizer and the analyzer.

8. A thermometer as defined in claim 1 in which the composition comprises magnesium nitrate hexahydrate.

9. A thermometer as defined in claim 1 in which the composition comprises benzophenone.

10. A thermometer as defined in claim 1 in which the composition comprises indole.

11. A thermometer as defined in claim 1 in which the composition is a coating on a translucent substrate.

12. A thermometer as defined in claim 1 in which the thickness of the coating is at least about 0.001 millimeter.

13. A thermometer as defined in claim 1 in which the composition includes an inorganic compound having a high surface area.

14. A thermometer as defined in claim 1 in which the composition includes a polymer.

15. A thermometer as defined in claim 1 in which at last two discrete areas which are adjacent in the same plane or optically spaced in parallel planes are occupied with compositions comprising a series of compounds or mixtures of compounds whose birefringence terminates at different temperatures.

16. A thermometer as defined in claim 15 in which the series of compounds includes the fatty acid series caproic, caprylic, capric, lauric, myristic, plamitic, and stearic acids.

17. A thermomemter as defined in claim 15 in which each of the sensing compositions are capsulated as small, spherical globules within polymeric shells.

18. A thermometer as defined in claim 15 in which each of the sensing compositions are dispersed as small globules throughout high viscosity, isotropic coatings in which the sensing compositions are essentially insoluble.

19. A thermometer device as defined in claim 1 in which at least two discrete areas spaced in parallel planes are occupied with compositions in intimate contact, said compositions comprising a series of compounds or mixtures of compounds whose birefringence terminates at different temperatures.

20. A thermometer as defined in claim 1 in which the polarizer is a circular-type and the polarized light beam passes through the composition to a mirror and is reflected back through the compositon to the analyzer.

21. A thermometer as defined in claim 1 in which the composition is adapted to undergo at least about 100 cycles of birefringence and nonbirefringence.

22. A thermometer as defined in claim 1 in which the composition is adapted to undergo at least one cycle from nonbirefringent to birefringent but which becomes irreversibly birefringent if the birefringent state is maintained longer than approximately 72 hours.

23. A thermometer as defined in claim 1 in which a substrate containing at least two chemical compositions is located between the polarizer and analyzer, a first chemical composition being birefringent at a first temperature and non-birefringent at a second temperature, and a second chemical composition that is birefringent at a third temperature and nonbirefringent at a fourth temperature.

24. A thermometer as defined in claim 1 in which the sensing composition is capsulated as small, approximately spherical globules within polymeric shells.

25. A thermometer as defined in claim 1 in which the sensing composition is dispersed as small globules throughout a high viscosity, isotropic coating in which the sensing composition is essentially insoluble.

26. A method of measuring temperature with an optical-type thermometer comprising the steps of: (1) providing a light beam from a source of illumination, (2) contacting with the light beam a layer on a substantially isotropic transparent substrate of a solid chemical composition of constant melting point that of itself senses changes in temperature and that is an anisotropic solid at a first temperature and an isotropic liquid at a second temperature, (3) providing a polarizer for polarizing the light beam befor contacting the composition, doubly refracting the polarized light beam at the first temperature when the composition is contacted, and providing an analyzer for analyzing the doubly refracted light beam passing through the composition, (4) sensing changes in the light coming from the composition that are due to changes in temperature in which the light from the composition at the first temperature is of sufficient brightness and intensity to provide an optical signal at the first temperature but not at the second.

27. An electrical-type thermometer comprising optical means for moving a light beam through the device, means for polarizing the light beam, means for analyzing the light beam, a layer on a substantially isotropic transparent substrate of a solid chemical composition of constant melting point that of itself senses changes in temerature, the composition doubly refracting the light beam at a first temperature when solid to pass the light beam through the device, and not doubly refracting the beam at a second temperature when melted so that the light does not pass through the device, and electrical means responsive to the passing of the light beam through the composition at the first temperature to provide an electrical response to a change in temperature.

28. A device as defined in claim 27 in which there is provided electrical control means for controlling electrical power to activate an electrical ircuit, the electrical control means being responsive to the light-detecting electrical means.

29. A method of measuring temperature with an electrical-type thermometer comprising the steps of: (1) providing a light beam from a source of illumination, (2) contacting with the light beam means for providing observable changes in temperature, including a layer on a substantially isotropic transparent substrate of a solid chemical composition of constant melting point that is responsive to changes in temperature and that is anisotropic at a first temperature when solid, and isotropic at a second temperature when melted, (3) providing a polarizer for polarizing the light beam before contacting the composition, doubly refracting the polarized beam at a first temperature when the composition is contacted, and providing for analyzing the doubly refracted light beam passing through the composition, and (4) detecting changes in light coming from the composition that are due to changes in temperature with light-detecting electrical means in which the light coming from the composition at the first temperature is of sufficient brightness and intensity to provide a signal.

30. A method of measuring temperature by an optical-type thermometer including a polarizer for a light beam, and a chemical composition that refracts the beam being analyzed, the composition containing a solid compound of constant melting-point that of itself senses changes in temperature, the compound being birefringent at a first temperature when solid and non-birefringent at a second temperature when melted, the method comprising passing the light beam through the chemical composition to doubly refract the beam at the first temperature, and passing the light beam through the chemical composition at the second temperature to not doubly refract the beam and provide visual indication of a difference in temperature between the first and second temperature.

31. An optical-type, temperature-responsive, light-gate device to be exposed to a source of illumination providing a light beam comprising, (1) at least one layer deposited on a substantially isotropic transparent substrate of a solid, meltable chemical composition that of itself senses temperature, the composition being triggered at a predetermined temperature from an anisotropic solid transmission state characteristic of the first temperature immediately contiguous to the predetermined temperature to an isotropic liquid state characteristic of the second temperature, and (2) means to intensify observable changes in the brightness and intensity of the light coming from the composition when the light-beam contacts the composition comprising a polarizer for polarizing the light-beam and an analyzer for analyzing the beam, the light-beam travelling through the composition that doubly refracts the beam when birefringent at the first temperature to pass the beam on through the analyzer.

32. A device as defined in claim 31 in which the temperature-responsive light-gate comprising, (1) at least one layer deposited on a substantially isotropic transparent substrate of a high viscosity, substantially transparent isotropic transparent coating in which are dispersed small globules of a solid, meltable chemical composition that of itself senses changes in temperature, the composition being triggered at a predetermined temperature from an isotropic solid transmission state characteristic of the first temperature immediately contiguous to the predetermined temperature to an isotropic liquid state characteristic of the second temperature, and (2) means to intensify observable changes in the brightness and intensity of the light coming from the composition when the light-beam contacts the composition comprising a polarizer for polarizing the light-beam and an analyzer for analyzing the beam, the light-beam travelling through the composition that doubly refracts the beam when birefringent at the first temperature to pass the beam on through the analyzer.

33. A device as defined in claim 31 and including a source of illumination providing a light-beam as an integral part of the device and light detecting means for detecting observable changes in the brightness and intensity of the light coming from the composition when the light-beam contacts the composition, the light from the composition at the first temperature being of sufficient brightness and intensity to provide an optical signal at the first temperature but not at the second temperature.

* * * * *